L. S. RICHEY.
AUTOMOBILE STEERING GEAR.
APPLICATION FILED MAY 15, 1912.
1,099,768.
Patented June 9, 1914.
2 SHEETS—SHEET 2.
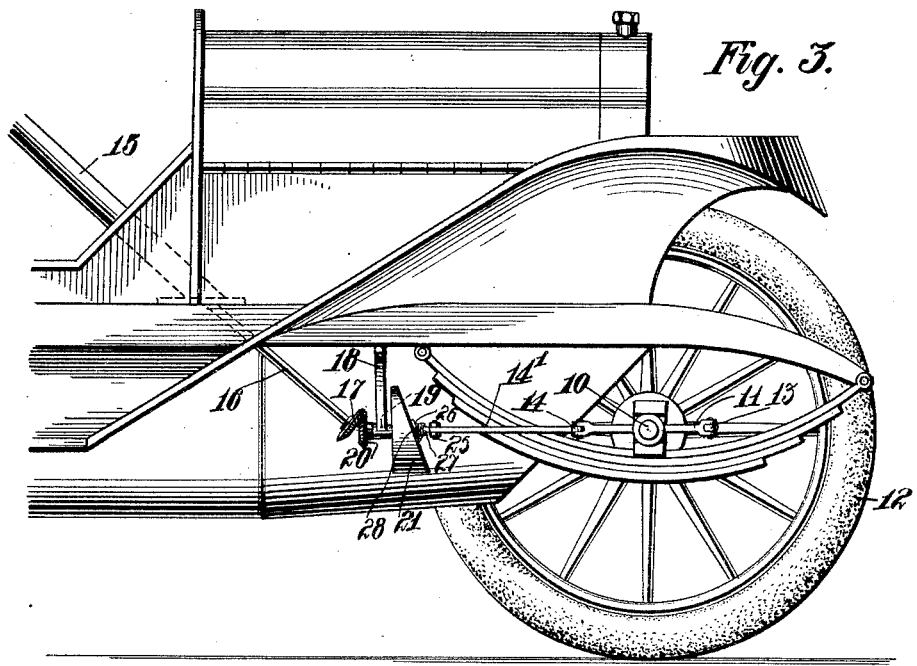
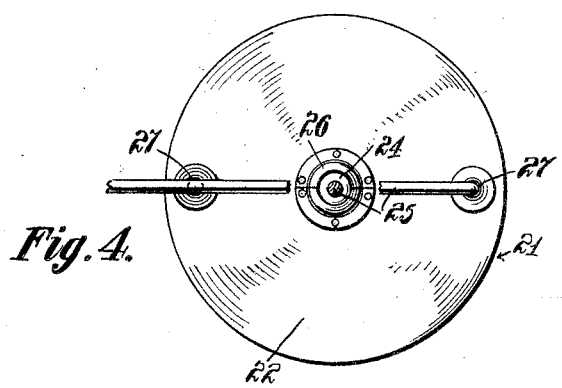
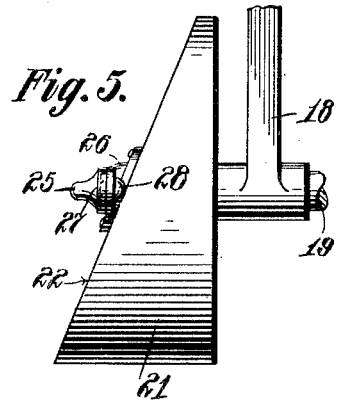
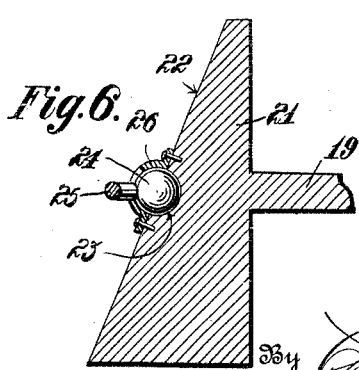
Witnesses
M. C. Fielding.
Harry M. Test.
Inventor
L. S. Richey,
By
Attorneys
COLUMBIA PLANOGRAPH CO., WASHINGTON, D. C.

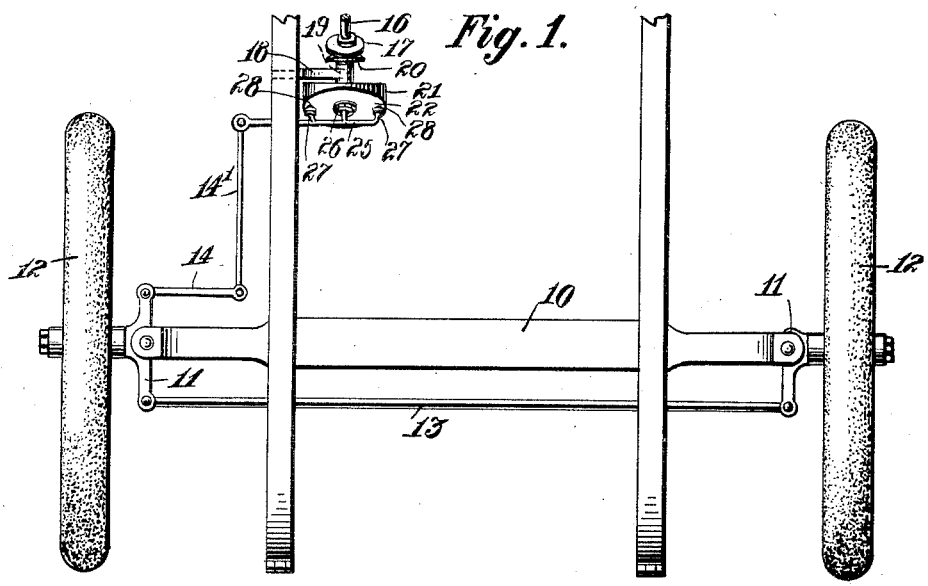

UNITED STATES PATENT OFFICE.

LLOYD S. RICHEY, OF DAYTON, IOWA.

AUTOMOBILE STEERING-GEAR.

1,099,768.          Specification of Letters Patent.          Patented June 9, 1914.

Application filed May 15, 1912.   Serial No. 697,493.

*To all whom it may concern:*

Be it known that I, LLOYD S. RICHEY, a citizen of the United States, residing at Dayton, in the county of Webster, State of Iowa, have invented certain new and useful Improvements in Automobile Steering-Gears; and I do hereby declare the following to be a full, clear, and exact description of the invention, such as will enable others skilled in the art to which it appertains to make and use the same.

This invention relates to improvements in automobile steering mechanism, and has particular reference to a novel method of steering the wheels of the front of the automobiles.

Other objects and advantages will be apparent from the following description and with particular reference to the accompanying drawings.

In the drawings: Figure 1 is a plan view of an automobile steering gear made in accordance with my invention, Fig. 2 is a plan view of the steering gear showing the wheels turned, one position being shown in dotted lines, Fig. 3 is a side elevation, Fig. 4 is an enlarged front elevation of the cam block, Fig. 5 is an enlarged side elevation of the cam block, Fig. 6 is a vertical section therethrough.

Referring particularly to the drawings, 10 represents the front axle of the automobile, provided with the usual steering knuckles 11 on opposite ends, on which are mounted the front wheels 12. A link 13 connects the steering knuckles, so that they will move in unison while a single link 14 is pivotally connected to one of the knuckles.

Mounted in the machine is the usual hollow rod 15 through which the steering post 16 passes. On the lower end of the steering post is a bevel pinion 17. Mounted on the forward part of the chassis adjacent the lower end of the steering post is a bracket 18 in which is journaled a short shaft 19. One end of this shaft carries the bevel pinion 20 which meshes with the pinion 17. On the opposite end of the shaft 19 is rigidly secured a block 21. This block is circular in cross section, and has an inclined forward end face 22 as clearly shown. In the center of the inclined face is formed a semi-spherical socket 23, to receive the ball 24 carried centrally by one arm of the lever 25, a split socket plate 26 secured to the block holding the ball rotatably thereto. The said arm of the lever 25 has a pair of fingers 27, in each of which is loosely mounted a roller bearing 28, said bearing engaging the inclined face 22 near its periphery. One end of the said arm of the lever 25 extends beyond one side of the face of the block 21 and is pivotally connected to the link 14, by its other arm 14′. Of course it will be understood that the upper end of the steering post is provided with the usual steering wheel, (not shown) by means of which the post is rotated.

In normal position, with the wheels toward the front, the block is as indicated in Fig. 1, that is with the low side of the beveled face of the block 20 at top, and the high side at the bottom.

To steer the vehicle the steering post is rotated to the right or left, as the case may be. Turning the post to the right or left causes the high side of the beveled face to move to the right and raise the adjacent end of the arm 25, thus moving the link 14 to the left and swinging the knuckles, so that the front wheels 12 will be turned to the right. A reverse movement of the steering post will cause the arm 25 to rock to the left which will move the link 14 to the right and swing the wheels to the left.

It will be noted that the device is simple and that the cam action of the block 20 in connection with the arm 25 will effectively swing the wheels to the right or left, according to what direction the steering post is rotated.

What is claimed is:

A steering mechanism for an automobile comprising a depending bracket carried by the chassis of the automobile, a longitudinal stub shaft rotatably mounted in the bracket, a block carried by the forward end of the stub shaft and provided with an inclined outer face, the opposite end of the shaft carrying a beveled pinion, said inclined face having a centrally disposed bearing socket, a transverse arm having a centrally carried ball movably engaged in the socket, roller carrying projections on the arm and engaging the inclined face adjacent the periphery thereof, a beveled pinion carried by the steering post of the automobile and engaging the said pinion, and a knuckle carried link pivotally connected with the said transverse arm.

In testimony whereof, I affix my signature, in presence of two witnesses.

LLOYD S. RICHEY.

Witnesses:
R. D. LEONARD,
S. W. BURNQUIST.

Copies of this patent may be obtained for five cents each, by addressing the "Commissioner of Patents, Washington, D. C."